US008387874B1

(12) United States Patent
Bohen et al.

(10) Patent No.: US 8,387,874 B1
(45) Date of Patent: Mar. 5, 2013

(54) MACHINE OUT OF SERVICE BASED ON BUSINESS HOURS

(75) Inventors: Daniel Christopher Bohen, Charlotte, NC (US); Amy Baker Folk, Charlotte, NC (US); Shane Anthony Johnson, Charlotte, NC (US); William Thomas Sanders, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 417 days.

(21) Appl. No.: 12/323,031

(22) Filed: Nov. 25, 2008

(51) Int. Cl.
*G06K 7/01* (2006.01)

(52) U.S. Cl. ...................... 235/382.5; 235/379; 235/382

(58) Field of Classification Search .................. 235/375, 235/376, 379, 380, 383; 705/1.1, 43
See application file for complete search history.

(56) References Cited

U.S. PATENT DOCUMENTS 6,672,505 B1 * 1/2004 Steinmetz et al. ............ 235/379
2001/0029528 A1 * 10/2001 Coutts et al. .................. 709/219
2002/0065914 A1 * 5/2002 Goodwin et al. ............. 709/225
2004/0068346 A1 * 4/2004 Boucher ......................... 700/241
2004/0133495 A1 * 7/2004 Bosch et al. ..................... 705/35
2004/0200690 A1 * 10/2004 Adams et al. ................. 194/302
2006/0249568 A1 * 11/2006 Scanlon ......................... 235/379
2007/0108267 A1 * 5/2007 Jonsson et al. ................ 235/379

* cited by examiner

*Primary Examiner* — Kristy A Haupt
(74) *Attorney, Agent, or Firm* — Banner & Witcoff, Ltd.; Michael A. Springs

(57) ABSTRACT

An aspect of the invention provides methods, computer media, and apparatuses to support the administration of a cash recycler system. An administrator sets hours of operation for the cash recycler system during which a user can access a cash handling device in the cash recycler system. The cash recycler system may be configured according to an operating time setting to operate between a beginning time and a terminating time, where the operating time setting may specify a periodic operating time for a specified day of the week. Access to the recycler system may be restricted based on identification information from a user and may be restricted only to an administrator outside configured operating hours. The recycler system may receive a calendar entry corresponding to a time period of operation and may override a periodic operating time by the time period contained in the calendar entry.

33 Claims, 13 Drawing Sheets

MACHINE OUT OF SERVICE BASED ON BUSINESS HOURS

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

A starting point for proper cash flow management involves use of cash flow projections. Accurate cash flow projections enable business mangers to make proper decisions regarding day-to-day operations and long-term strategic decisions such as investment decisions.

Good cash flow projections involve using up-to-date accurate data regarding inflows and outflows of cash over a period of time. These projections which may be in the form of cash flow statements involve estimation of operating cash flow. However, timely up-to-date data concerning operating cash flow is difficult to obtain in large retail operations. In large retail operations, accurate cash flow data may not be known until business close, as an accounting of each cash register's drawer has to be completed and reported to a corporate back office.

For example, a multi-store grocery chain may have multiple cashiers at each store handling numerous customers during a business day. When each store closes or at the end of the cashier's shift, each of the cashiers may have to tally in their cash register so that a final tally may be determined each store closing. At certain time of day the result may be forwarded to a central office which may be used to calculate cash flow for the grocery chain.

At particular scheduled times, which may range from daily to once every few days or longer, an armored car or other means of transportation may be arranged such that cash receipts from the day or some other period of time may be picked up and transferred to a financial center or branch for deposit. Upon delivery to the financial center, cash may be deposited and may be made available for use by the business in another one to four business days.

However, the desired usage of a cash recycler may vary from day to day, thus necessitating that the configuration of the cash recycler be modified to better accommodate the changing usage. A need consequently exists for providing a flexible and convenient approach for the administration of a cash recycler.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

With one aspect of the invention, methods, computer media, and apparatuses support the administration of a cash recycler system. An administrator sets hours of operation for a cash recycler system during which a user can access a cash handling device in the cash recycler system.

Furthermore, according to another aspect of the invention, a cash handling system (cash recycler system) is configured according to an operating time setting to operate between a beginning time and a terminating time. Consequently, a request at the recycler system is supported only between the beginning time and the terminating time.

According to another aspect of the invention, the operating time setting specifies a periodic operating time for a specified day of the week.

According to another aspect of the invention, access to the recycler system is restricted based on identification information from a user. The identification information may include a password or biometric characteristics.

According to another aspect of the invention, access to a recycler system is restricted only to an administrator outside configured operating hours. When a user who does not have administrator permission attempts to access the recycler system outside the operating hours, an error message and/or alert message may be generated.

According to another aspect of the invention, a recycler system may receive a calendar entry corresponding to a time period of operation. The recycler system may override a periodic operating time by the time period contained in the calendar entry.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing currency handling services and management. A financial institution such as a bank may provide immediate access and use of funds recently deposited using the currency handling apparatus, system, and method described below. For illustrative purposes the financial instrument discussed throughout the below description is cash. However, as those skilled in the art will realize, the described aspects of the invention are not limited to just cash (paper money and coins) but may also include other forms of liquid assets such as checks, bank notes, and money orders.

Cash handling devices generally refer to devices that are configured to accept and/or dispense currency. Cash handling devices include payment kiosks, point of sale systems such as cash registers, automated teller machines (ATMs), currency recyclers, depositories, dispensing devices and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
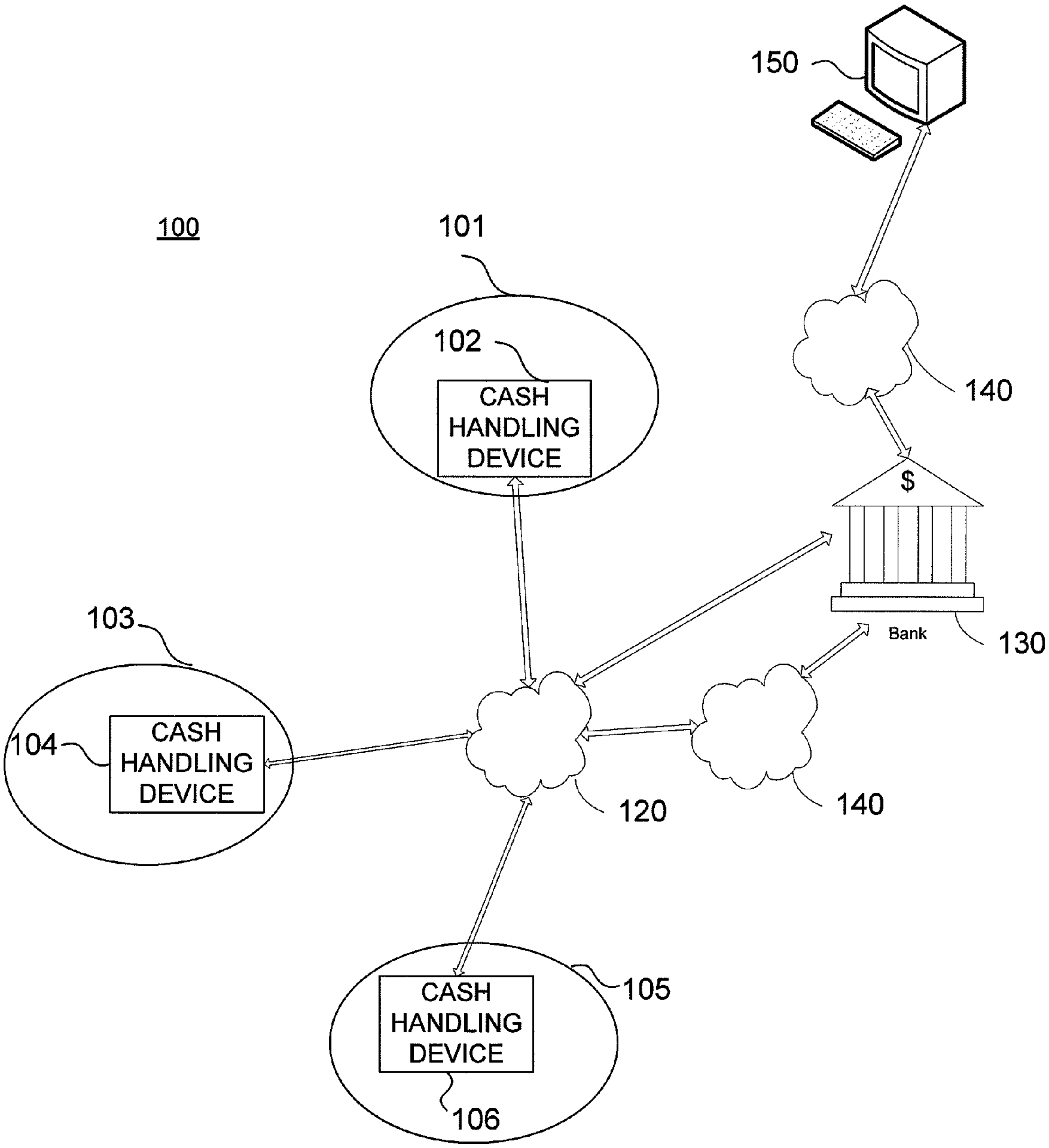
FIG. 1 illustrates an example of a suitable operating environment in which various aspects of the disclosure may be implemented.

FIG. 1 illustrates an example of suitable operating environment 100 in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
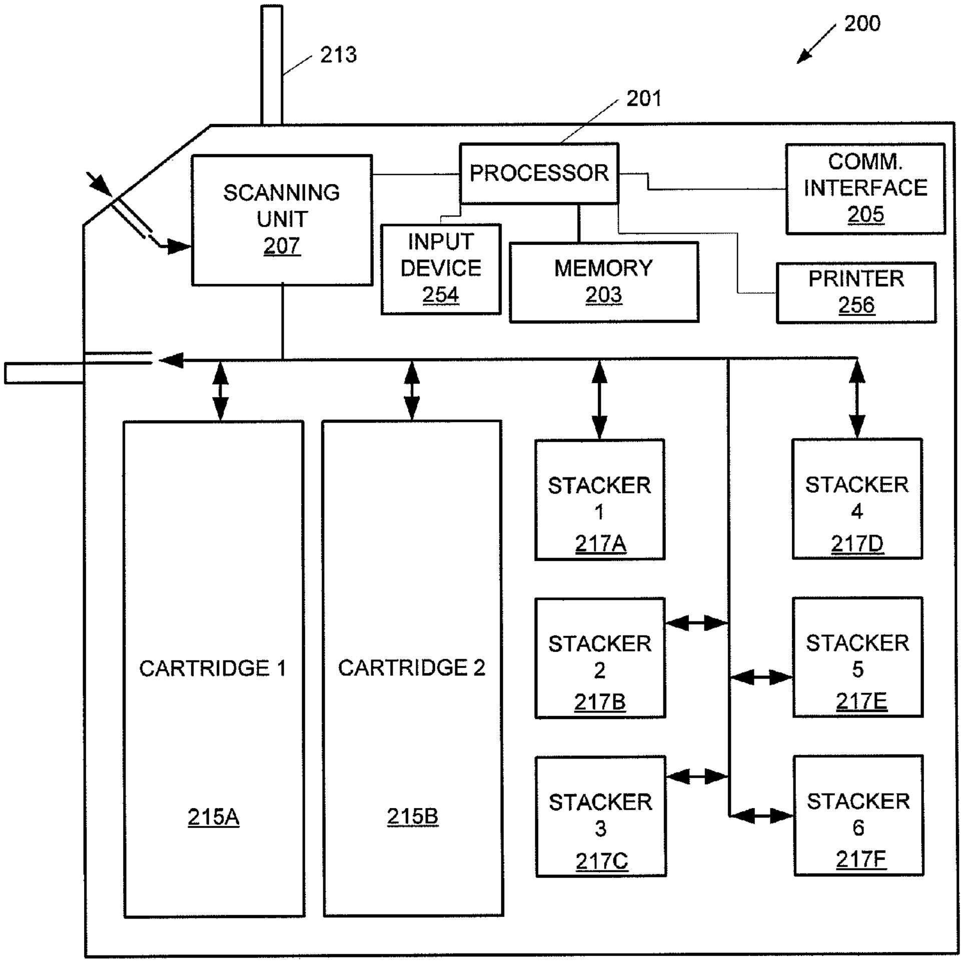
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, unauthorized reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
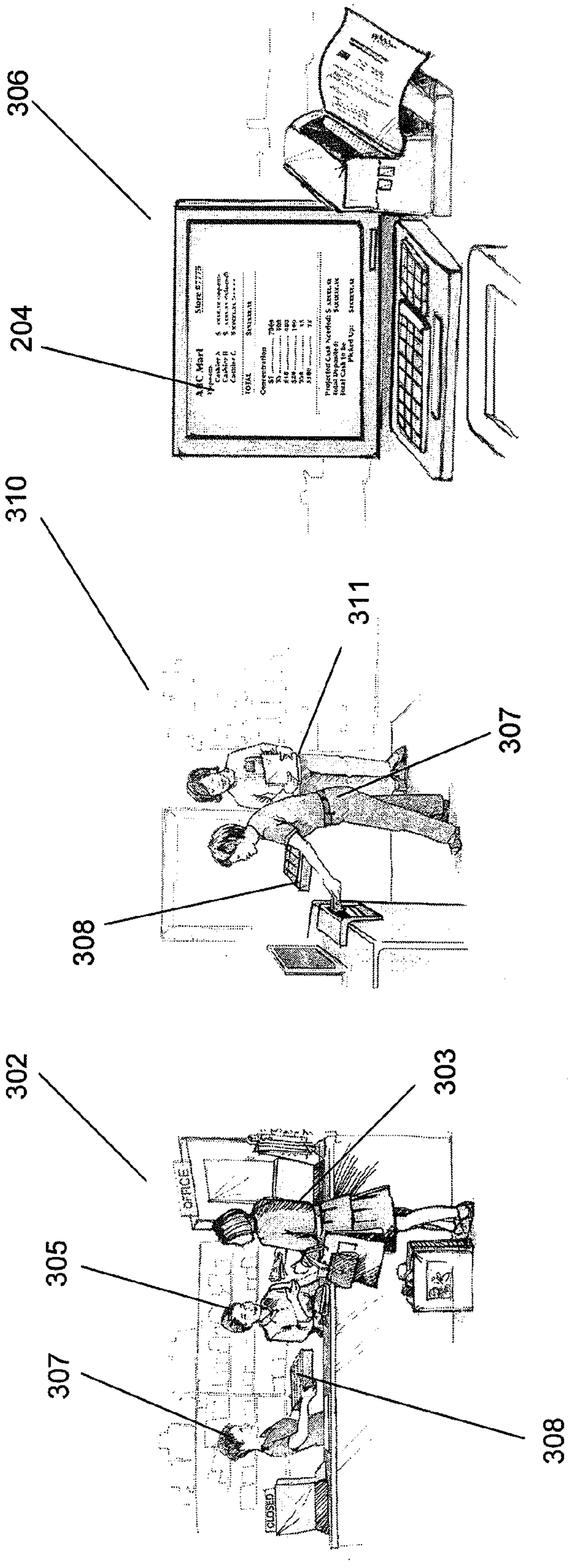
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
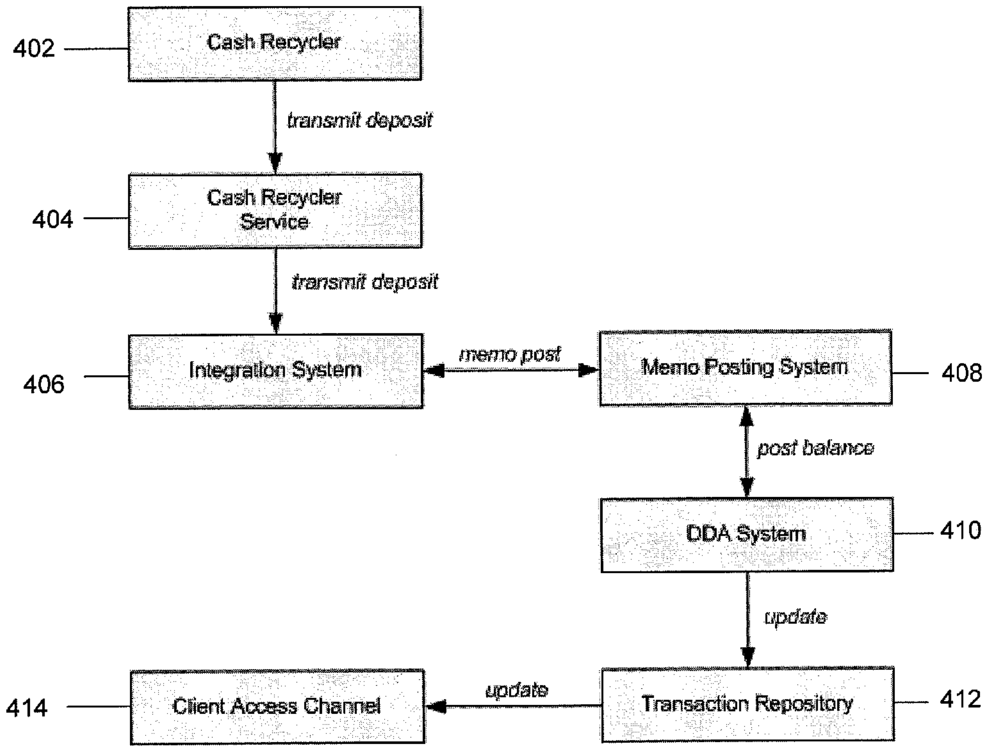
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
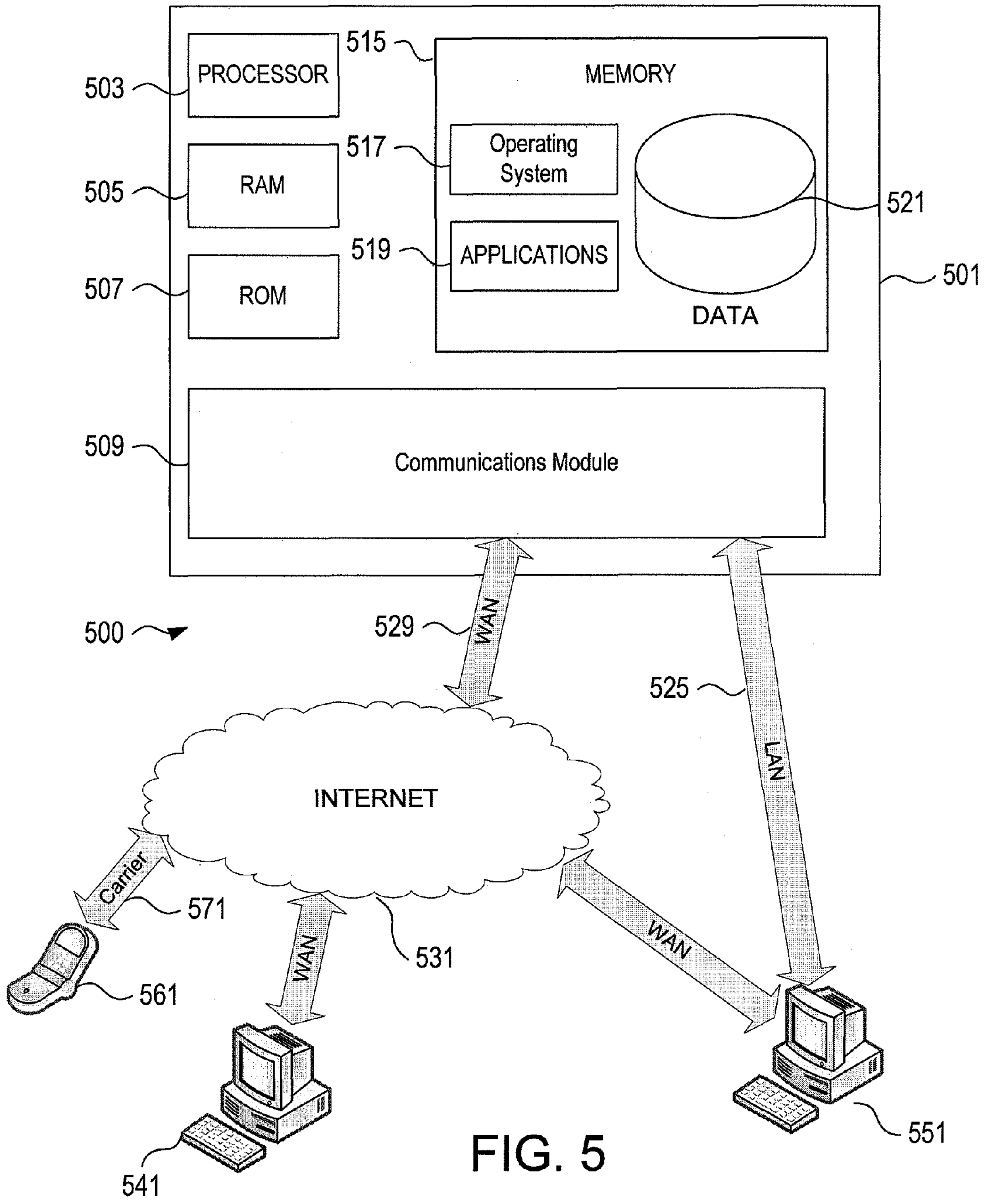
FIG. 5 shows an illustrative operating environment in which various aspects of the invention may be implemented in accordance with an aspect of the invention.

FIG. 5 illustrates an example of a suitable computing system environment 500 (e.g., for executing processes 600, 700, 800, and 900 as shown in FIGS. 6-9, respectively) that may be used according to one or more illustrative embodiments. The computing system environment 500 is only one example of a suitable computing environment and is not intended to suggest any limitation as to the scope of use or functionality of the invention. The computing system environment 500 should not be interpreted as having any dependency or requirement relating to any one or combination of components shown in the illustrative computing system environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 5, the computing system environment 500 may include a computing device 501 wherein the processes discussed herein may be implemented. The computing device 501 may have a processor 503 for controlling overall operation of the computing device 101 and its associated components, including RAM 505, ROM 507, communications module 509, and memory 515. Computing device 501 typically includes a variety of computer readable media. Computer readable media may be any available media that may be accessed by computing device 501 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 501.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 505 may include one or more are applications representing the application data stored in RAM memory 105 while the computing device is on and corresponding software applications (e.g., software tasks), are running on the computing device 501.

Communications module 509 may include a microphone, keypad, touch screen, and/or stylus through which a user of computing device 501 may provide input, and may also include one or more of a speaker for providing audio output and a video display device for providing textual, audiovisual and/or graphical output.

Software may be stored within memory 515 and/or storage to provide instructions to processor 503 for enabling computing device 501 to perform various functions. For example, memory 515 may store software used by the computing device 501, such as an operating system 517, application programs 519, and an associated database 521. Alternatively, some or all of the computer executable instructions for computing device 501 may be embodied in hardware or firmware (not shown).

Computing device 501 may operate in a networked environment supporting connections to one or more remote computing devices, such as branch terminals 541 and 551. The branch computing devices 541 and 551 may be personal computing devices or servers that include many or all of the elements described above relative to the computing device 501. Branch computing device 561 may be a mobile device communicating over wireless carrier channel 571.

The network connections depicted in FIG. 5 include a local area network (LAN) 525 and a wide area network (WAN) 529, but may also include other networks. When used in a LAN networking environment, computing device 501 is connected to the LAN 525 through a network interface or adapter in the communications module 509. When used in a WAN networking environment, the server 501 may include a modem in the communications module 509 or other means for establishing communications over the WAN 529, such as the Internet 531. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 519 used by the computing device 501, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 501. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 501. Such a processor may execute computer-executable instructions stored on a computer-readable medium.

Figure 6:
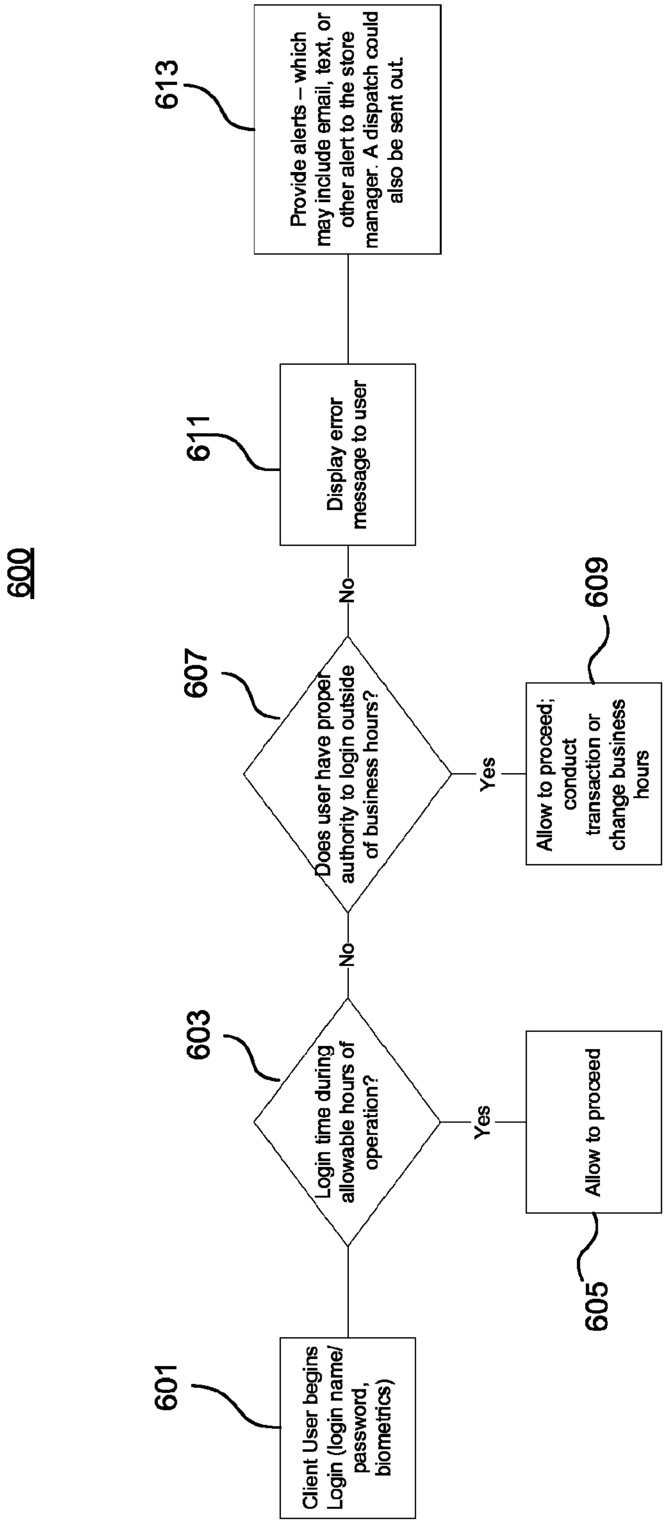
FIG. 6 shows a flow diagram for configuring a recycler system for hours of operation in accordance with an aspect of the invention.

FIG. 6 shows flow diagram 600 for configuring a recycler (e.g., recycler 200 as shown in FIG. 2) for hours of operation in accordance with an aspect of the invention. In step 601, process 600 verifies the identity of the user through an authentication procedure, e.g., a login name/password combination or biometric measurement.

Biometric characteristics may be divided into two classes: physiological and behavior. Physiological biometric characteristics are related to the shape of the body. e.g., fingerprints. Other examples are face recognition, hand geometry, and iris recognition. In addition, process 600 may merge human perception to a computer database in a brain-machine interface. This approach may be referred to as cognitive biometrics. Cognitive biometrics is based on specific responses of the brain to stimuli which could be used to trigger a computer database search. Cognitive biometrics systems may use brain response to odor stimuli, facial perception, and mental performance for search at ports and high security areas. Behavioral biometric characteristics are related to the behavior of a person and may include the signature of the person. However, behavioral biometric characteristics may be extended to keystroke dynamics and voice characteristics. Voice is typically considered a physiological trait because every person has a different pitch, but voice recognition is mainly based on the study of the way a person speaks, commonly classified as behavioral. Other biometric strategies may be based on gait (way of walking), retina, hand veins, ear canal, facial thermogram, DNA, odor and scent, and palm prints.

Figure 7:
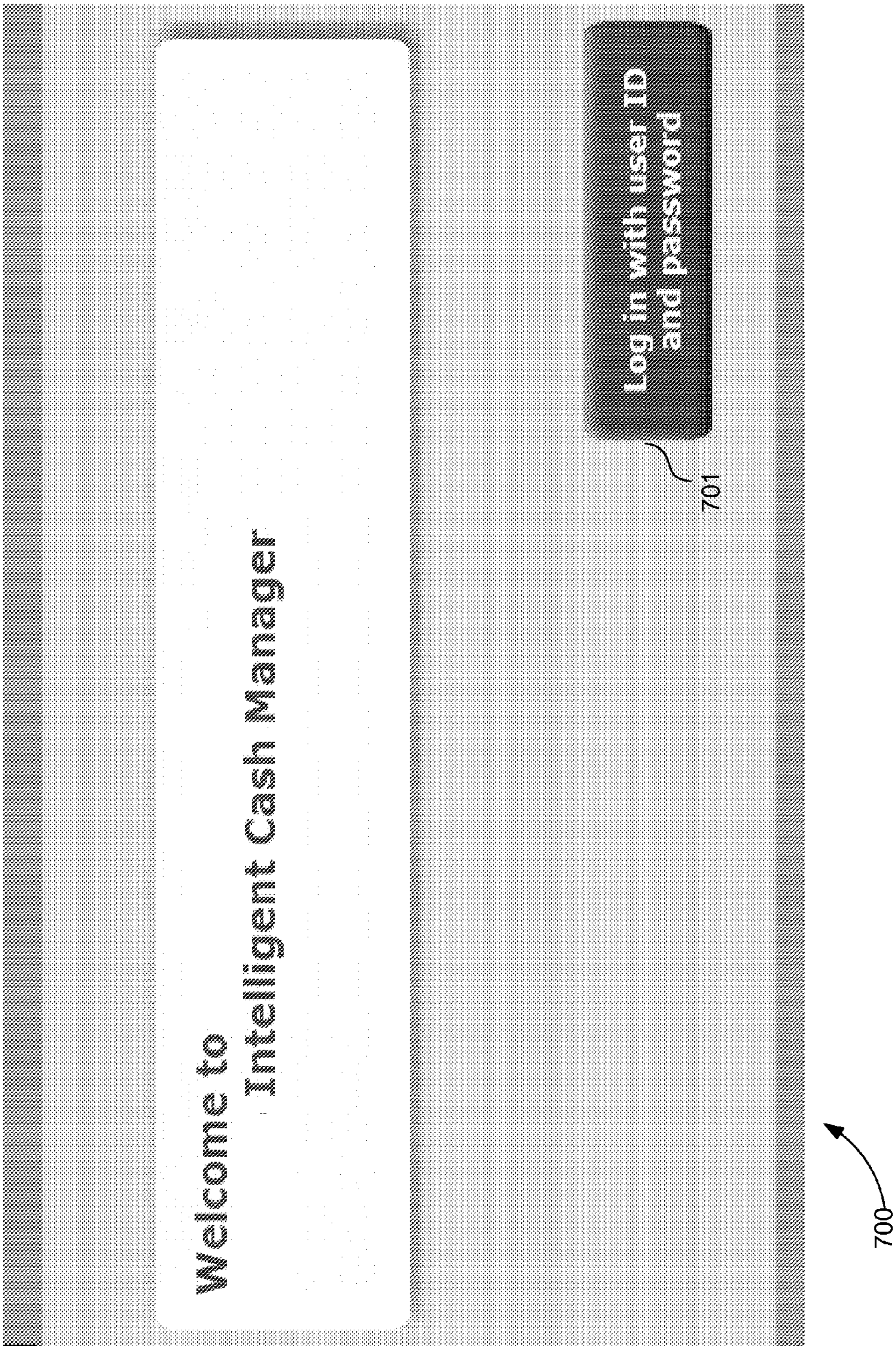
FIG. 7 shows an initial screen shot when a user attempts to access a recycler system in accordance with an aspect of the invention.

FIG. 7 shows initial screen shot 700 when a user attempts to access a recycler system in accordance with an aspect of the invention. A cash recycler system (e.g., system 100) may contain one or more cash handling devices (cash recyclers). The scenario shown in FIGS. 7-12 may apply to one, some, or all of the cash handling devices in the cash recycler system. The user is asked to log in with a user ID and password 701.

Figure 8:
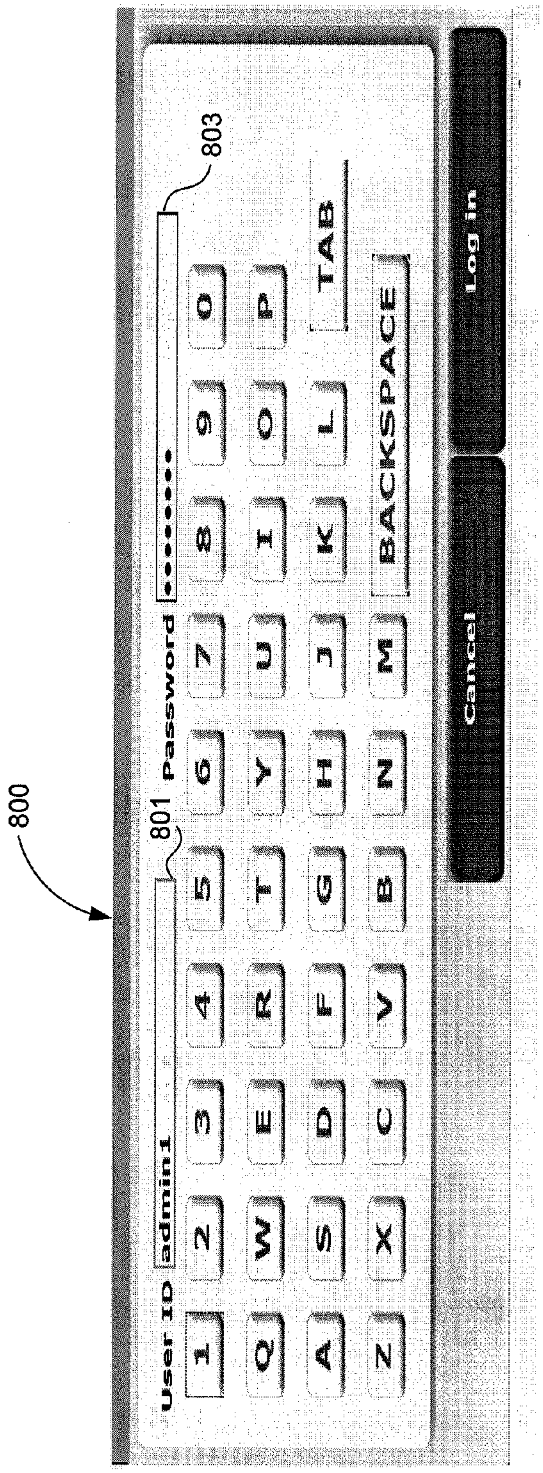
FIG. 8 shows a screen shot when a user logins into a recycler system in accordance with an aspect of the invention.

FIG. 8 shows screen shot 800 when a user logins into a recycler system in accordance with an aspect of the invention. The user must enter a valid user id/password combination in user id 801 and password 803 in order to successfully login into the cash recycler system.

Figure 9:
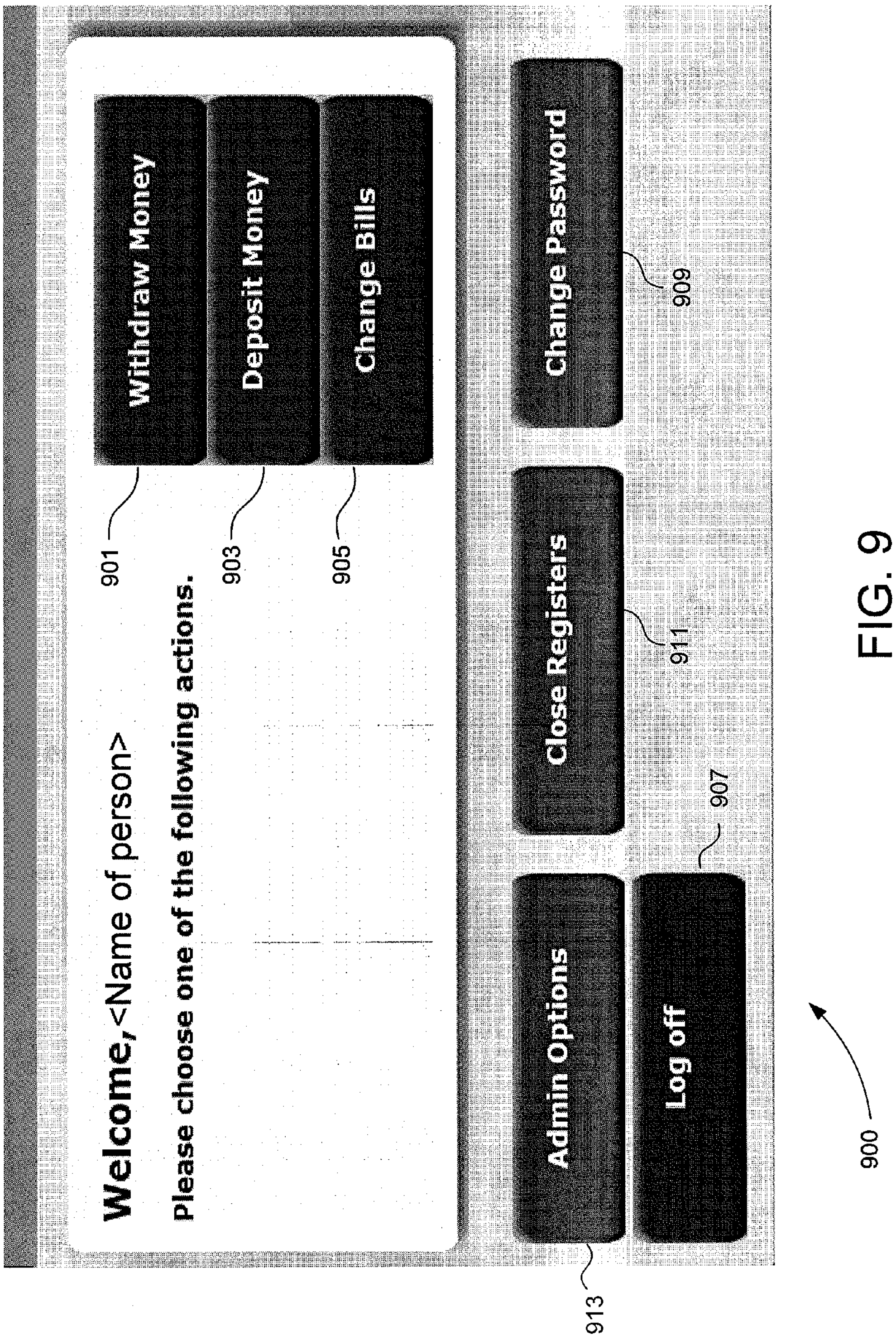
FIG. 9 shows a screen shot with functional display items in accordance with an aspect of the invention.

FIG. 9 shows screen shot 901 with functional display items in accordance with an aspect of the invention. Referring to screen shot 800, the user (i.e., name of person logging in) is identified as an administrator and thus has permission to administrative capabilities 907, 909, 911, and 913 as well as non-administrative capabilities 901, 903, and 905. With the exemplary scenario shown in FIGS. 7-12, the user selects Admin Options 913 to configure a cash recycler system for the hours of operation. The user is not limited to configuring only one recycler but may configure a group of cash recyclers in a cash recycler system (e.g., cash handling devices 102, 104, and 106) at a given time.

Figure 10:
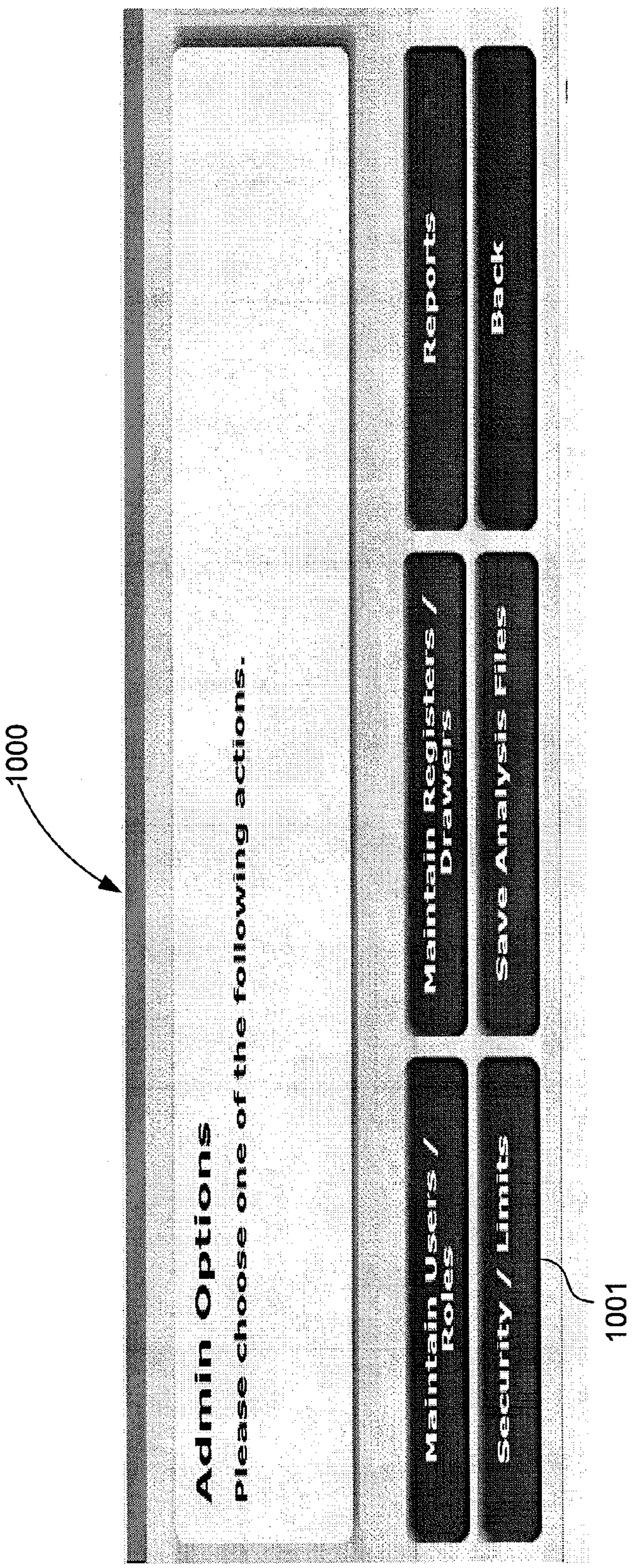
FIG. 10 shows a screen shot with administrative display items in accordance with an aspect of the invention.

FIG. 10 shows screen shot 1000 with administrative display items corresponding to admin options 913 as shown in screen shot 900 in accordance with an aspect of the invention. The user (who must administrative permissions) may select from a number of administrative functions. With the exemplary scenario, the user selects security/limits 1001.

Figure 11:
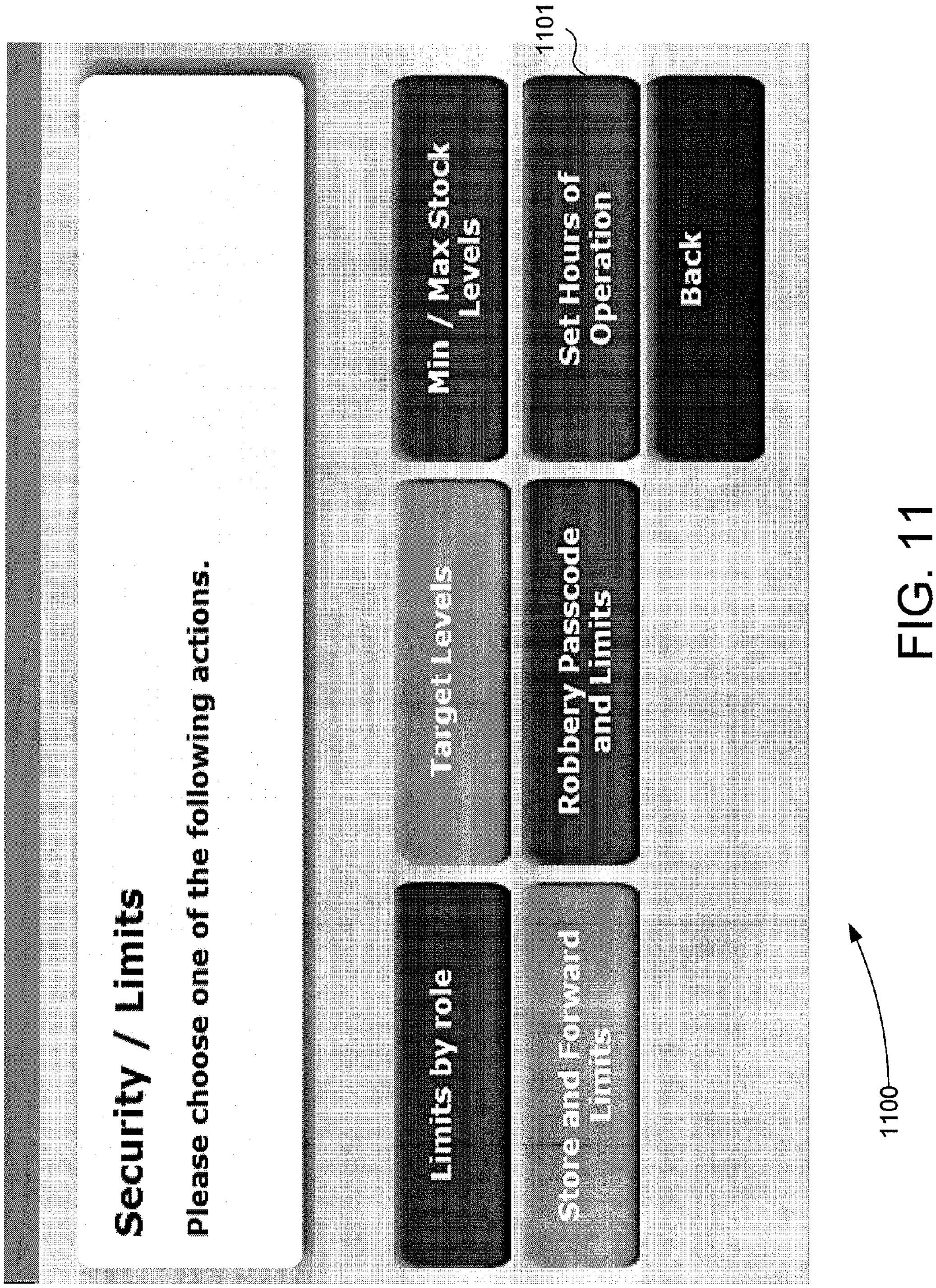
FIG. 11 shows a screen shot with security/limits display items in accordance with an aspect of the invention.

FIG. 11 shows screen shot 1100, which is associated with security/limits display items in accordance with an aspect of the invention. With the exemplary scenario, the user selects set hours of operation 1101 in order to configure the cash recycler's hours of operation.

Figure 12:
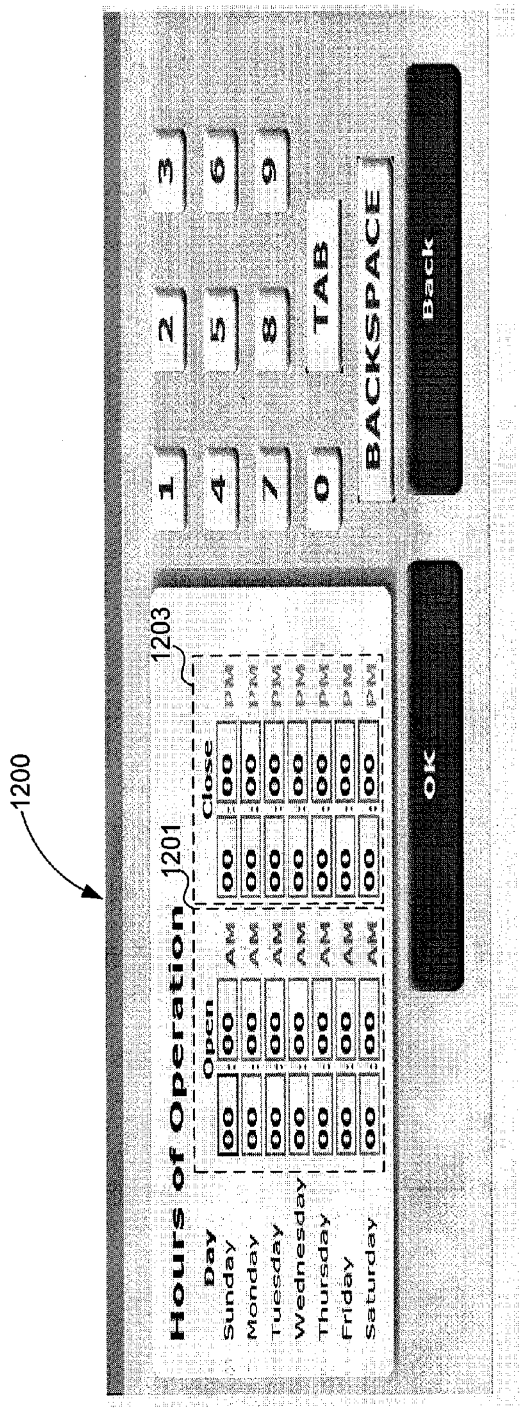
FIG. 12 shows a screen shot that enables an administrator to configure the hours of operation for a recycler system in accordance with an aspect of the invention.

FIG. 12 shows screen shot 1200 that enables an administrator to configure the hours of operation for a recycler system in accordance with an aspect of the invention. The administrator may select opening (beginning) times of operation on a per day basis from selections 1201 and closing (terminating) times of operation from selections 1203. The configured hours are configured on a periodic basis, in which a given day of the week (e.g., Monday) is configured with the same opening and closing times without special consideration of events and holidays. However, hours of operation are typically adjusted for holidays. As will be discussed, further administrative capabilities enable the administrator to configure hours of operations for particular days (e.g., Christmas, December 25) so that hours of operation can be altered from the periodic hours of operation.

Figure 13:
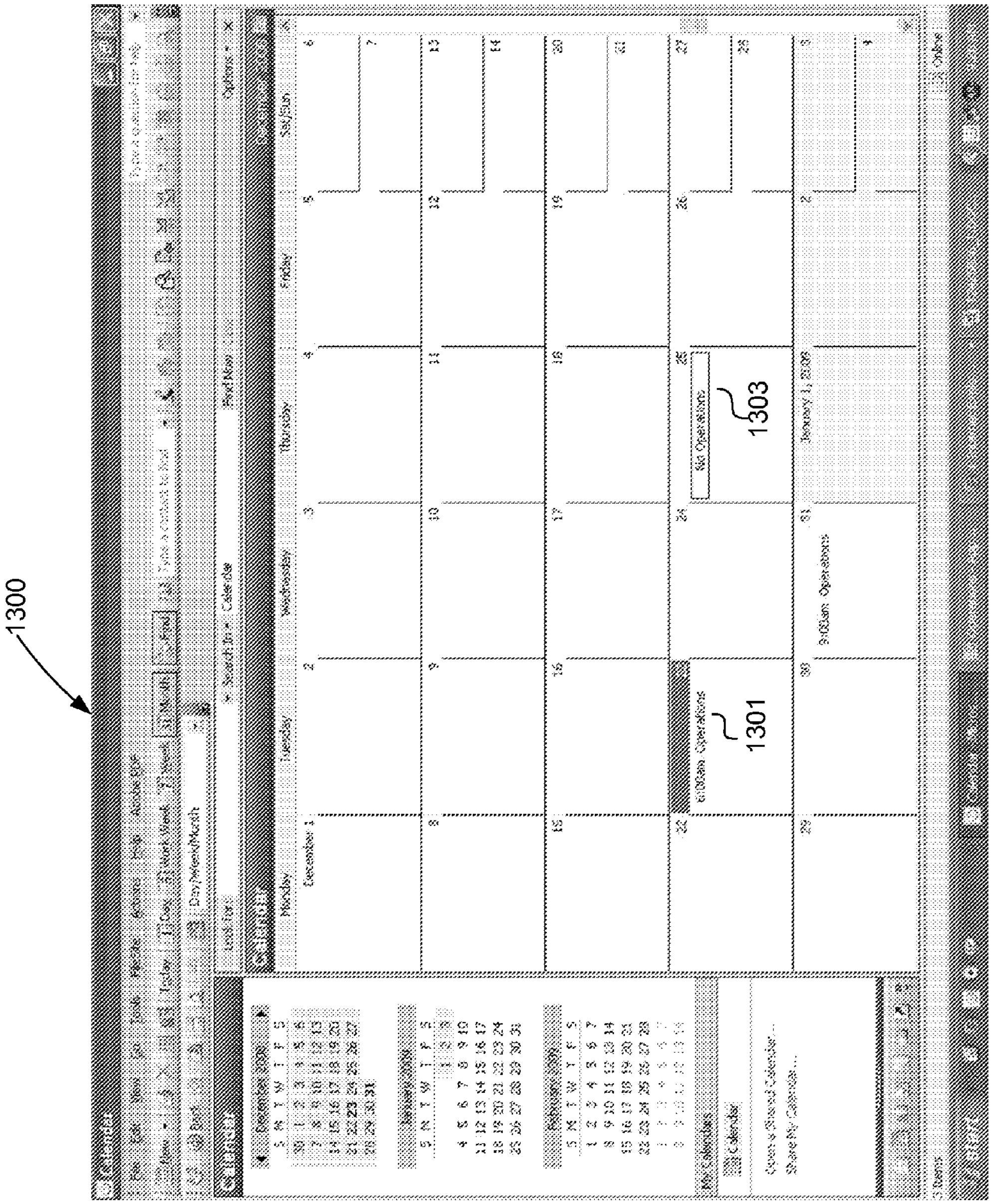
FIG. 13 shows a screen shot with a calendar display that enable an administrator to configure the hours of operation for a recycler system in accordance with an aspect of the invention.

FIG. 13 shows screen shot 1300 with a calendar display that enable an administrator to configure the hours of operation for a recycler system in accordance with an aspect of the invention. The administrator may set the hours of operation for any specific day using the calendar capability. However, the administrator typically sets the hours of operation with the calendar capability only when the hours of operation vary from the periodically set hours. For example, entry 1301 (corresponding to December 23) sets the opening time to 6:00 am, while entry 1303 (corresponding to December 25) does not set any operation during Christmas. Moreover, the exception hours may be optionally repeated every year, e.g., when a holiday occurs on the same day each year.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-assisted method comprising:

configuring, by a processor and based on a received input, an operating time setting of a cash recycler system to operate between a first beginning time and a first terminating time;

subsequent to the configuring, overriding the operating time setting of the cash recycler system with a time period included in a calendar entry;

supporting, by the processor with an operating environment, a first request from a user at the cash recycler system only between the first beginning time and the first terminating time specifying a scheduled time; and rejecting, by the processor with the operating environment and without servicing intervention at the cash recycler system, a second request from the user at the cash recycler system that does not occur during the scheduled time, wherein the first and second requests initiate one of an acceptance of cash and a dispensing of cash.

2. The method of claim 1, further comprising:

reconfiguring the operating time of the cash recycler system to operate between a second beginning time and a second terminating time; and supporting a third request from the user at the cash recycler system only between the second beginning time and the second terminating time.

3. The method of claim 1, wherein the operating time setting specifies a periodic operating time for a specified day of a week.

4. The method of claim 3, further comprising:

overriding the operating time setting of the cash register system with an adjusted hours of operation for at least one holiday.

5. The method of claim 1, further comprising:

restricting access to the cash recycler system based on identification information.

6. The method of claim 5, wherein the identification information includes a password.

7. The method of claim 5, wherein the identification information includes a biometric characteristic.

8. The method of claim 1, further comprising:

restricting access to the cash recycler system for outside operating hours only to an administrator, wherein the operating hours are configured according to the operating time setting; and allowing the administrator to modify the operating hours.

9. The method of claim 1, further comprising:

when the user attempts to access the cash recycler system, generating an error message to the user, wherein the user does not have administrative permission.

10. The method of claim 9, further comprising:

generating an alert message about the attempted access.

11. The method of claim 1, further comprising:

displaying administrative display objects only when the cash recycler system is accessed by an administrator.

12. The method of claim 1, further comprising:

configuring an inactive time setting of the cash recycler system to operate between the first beginning time and the first terminating time; and denying access to the cash recycler system by the user during the inactive time.

13. The method of claim 1, further comprising:

displaying a calendar display including the calendar entry; and receiving the calendar entry, wherein the calendar entry corresponds to the time period of operation of the cash recycler system.

14. The method of claim 1, further comprising:

configuring the operating setting of the cash recycler system with a periodic operating time for a specified day of a week.

15. The method of claim 14, further comprising:

when the calendar entry corresponds to a holiday having a fixed day of the year, repeating the time period in the calendar entry for a subsequent year.

16. An apparatus comprising:

a memory; and a processor coupled to the memory and configured to perform, based on instructions stored in the memory:

configuring, based on a received input, an operating time setting of a cash recycler system to operate between a first beginning time and a first terminating time;

subsequent to the configuring, overriding the operating time setting of the cash recycler system with a time period included in a calendar entry;

supporting a first request from a user at the cash recycler system with an operating environment only between the first beginning time and the first terminating time specifying a scheduled time; and rejecting, without servicing intervention at the apparatus, a second request from the user at the cash recycler system with the operating environment that does not occur during the scheduled time, wherein the first and second requests initiate one of an acceptance of cash and a dispensing of cash.

17. The apparatus of claim 16, wherein the processor is further configured to perform:

reconfiguring the operating time of the cash recycler system to operate between a second beginning time and a second terminating time; and supporting a third request from the user at the cash recycler system only between the second beginning time and the second terminating time.

18. The apparatus of claim 16, wherein the operating time setting specifies a periodic operating time for a specified day of a week.

19. The apparatus of claim 16, wherein the processor is further configured to perform:

restricting access to the cash recycler system based on identification information.

20. The apparatus of claim 16, wherein the processor is further configured to perform:

restricting access to the cash recycler system for outside operating hours only to an administrator, wherein the operating hours are configured according to the operating time setting; and allowing the administrator to modify the operating hours.

21. The apparatus of claim 16, wherein the processor is further configured to perform:

when the user attempts to access the cash recycler system, generating an error message to the user, wherein the user does not have administrative permission.

22. The apparatus of claim 16, wherein the processor is further configured to perform:

displaying administrative display objects only when the cash recycler system is accessed by an administrator.

23. The apparatus of claim 16, wherein the processor is further configured to perform:

displaying a calendar display; and receiving a calendar entry, wherein the calendar entry corresponds to a time period of operation of the cash recycler system.

24. The apparatus of claim 23, wherein the processor is further configured to perform:

configuring the operating setting of the cash recycler system with a periodic operating time for a specified day of a week; and subsequent to the configuring with the periodic operating time, overriding the operating setting of the cash recycler system with the time period included in the calendar entry.

25. A non-transitory computer-readable storage medium storing computer-executable instructions that, when executed, cause a processor to perform a method comprising:

configuring, based on a received input, an operating time setting of a cash recycler system to operate between a first beginning time and a first terminating time;

subsequent to the configuring, overriding the operating time setting of the cash recycler system with a time period included in a calendar entry;

supporting a first request from a user at the cash recycler system with an operating environment only between the first beginning time and the first terminating time specifying a scheduled time; and rejecting, without servicing intervention at the cash recycler system, a second request from the user at the cash recycler system that does not occur during the scheduled time, wherein the first and second requests initiate one of an acceptance of cash and a dispensing of cash.

26. The computer-readable medium of claim 25, said method further comprising:

reconfiguring the operating time of the cash recycler system to operate between a second beginning time and a second terminating time; and supporting a third request from the user at the cash recycler system only between the second beginning time and the second terminating time.

27. The computer-readable medium of claim 25, wherein the operating time setting specifies a periodic operating time for a specified day of a week.

28. The computer-readable medium of claim 25, said method further comprising:

restricting access to the cash recycler system based on identification information.

29. The computer-readable medium of claim 25, said method further comprising:

restricting access to the cash recycler system outside operating hours only to an administrator, wherein the operating hours are configured according to the operating time setting; and allowing the administrator to modify the operating hours.

30. The computer-readable medium of claim 25, said method further comprising:

when the user attempts to access the cash recycler system, generating an error message to the user, wherein the user does not have administrative permission.

31. The computer-readable medium of claim 25, said method further comprising:

displaying administrative display objects only when the cash recycler system is accessed by an administrator.

32. The computer-readable medium of claim 25, said method further comprising:

displaying a calendar display; and receiving a calendar entry, wherein the calendar entry corresponds to a time period of operation of the cash recycler system.

33. The computer-readable medium of claim 32, said method further comprising:

configuring the operating setting of the cash register system with a periodic operating time for a specified day of a week; and subsequent to the configuring with the periodic operating time, overriding the operating setting of the cash recycler system with the time period included in the calendar entry.

* * * * *